A. L. SHAW.
WRENCH.
APPLICATION FILED DEC. 3, 1907.
899,336.
Patented Sept. 22, 1908.
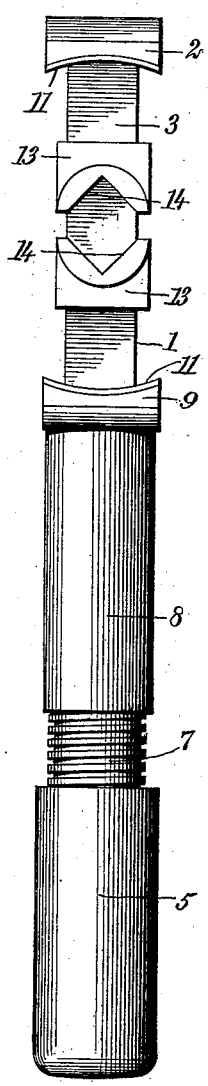
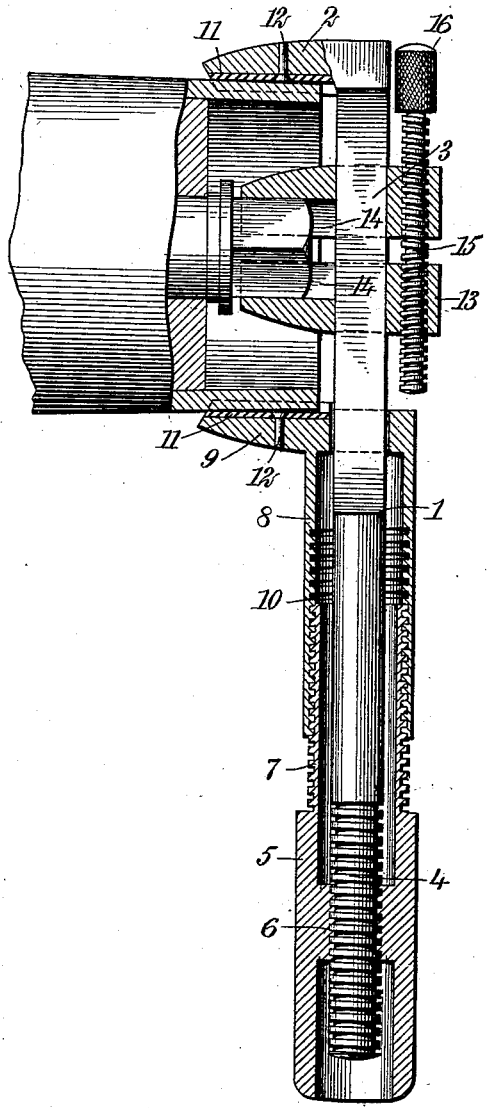
Fig. 1
Fig. 2
WITNESSES
E. G. Bromley
John K. Brainard
INVENTOR
Albert L. Shaw
BY Munn & Co
ATTORNEYS.

UNITED STATES PATENT OFFICE.

ALBERT LEMUEL SHAW, OF CORINNE, UTAH.

WRENCH.

No. 899,336.   Specification of Letters Patent.   Patented Sept. 22, 1908.

Application filed December 3, 1907. Serial No. 404,937.

*To all whom it may concern:*

Be it known that I, ALBERT LEMUEL SHAW, a citizen of the United States, and a resident of Corinne, in the county of Boxelder and State of Utah, have invented a new and Improved Wrench, of which the following is a full, clear, and exact description.

This invention relates to wrenches, and it is particularly useful in connection with devices of this kind used for removing and replacing vehicle wheels and the like.

An object of the invention is to provide a simple, strong and durable wrench, by means of which vehicle wheels can be removed easily and expeditiously, and which prevents marring or other injury of the vehicle wheel in the operation of removing or replacing the same.

A further object of the invention is to provide a device of the class described, having means for gripping a vehicle wheel hub and means for gripping the retaining nut, so that the wheel itself can be turned to unscrew the nut or to screw the same into position.

A still further object of the invention is to provide a wrench adapted to grip a wheel hub and the retaining nut for the wheel, so that the wheel itself can be rotated to remove the nut or screw it into position, and which adjusts itself to the form of the hub and the location of the nut.

The invention consists in the construction and combination of parts, to be more fully described hereinafter and directly set forth in the claim.

Reference is to be had to the accompanying drawings forming a part of this specification, in which similar characters of reference indicate corresponding parts in both views.

Figure 1 is a front elevation of the wrench, and Fig. 2 is a longitudinal section of the wrench showing the same applied to a vehicle hub.

Before proceeding to a more detailed explanation of my invention, it should be understood that it is of advantage in removing or replacing a vehicle wheel to clamp the nut so that it is rigid with respect to the hub, in order to permit the nut to be unscrewed or screwed into position by the rotation of the wheel itself in one direction or the other. It is obvious that in using the wheel to unscrew or screw up the nut, a far greater leverage can be exerted than is normally possible with the ordinary wrench or similar device. My wrench provides means for holding the nut rigid with respect to the wheel hub, and for this purpose has a pair of hub jaws and a pair of nut jaws. These pairs of jaws are relatively independent and are independently operable, consequently the jaws will adjust themselves to the form of the hub and the location of the nut, respectively.

Referring more particularly to the drawings, I provide a shank 1 having at one end a hub jaw 2. The portion 3 of the shank 1 adjacent to the jaw 2 is of angular cross section and for a purpose which will appear hereinafter. The end of the shank remote from the jaw 2 is provided with a thread 4. A hollow handle 5 has a section 6 interiorly threaded to correspond to the thread 4 of the shank with which it engages, the shank being arranged within the hollow handle. A sleeve 8 has at the upper end a hub jaw 9 and is formed to receive the shank 1. The sleeve 8 has an interior thread 10 corresponding to the thread 7 of the handle portion and adapted to engage the same. Owing to the opposite threading of the parts, the shank and the sleeve are movable longitudinally of the handle in opposite directions when the latter is rotated. Consequently, as both the hub jaws are moved when the handle is turned, the jaws will be separated or approached with greater rapidity than is the case with the jaws of the ordinary wrench.

The adjacent or inner faces of the hub jaws are preferably concave, so that they will firmly grip the outer rounded hub surface. To prevent marring of the hub or other injury thereto, I provide a facing 11 for each of the concave jaw surfaces. The facings may consist of leather, rubber or other suitable material, and are secured in position by means of rivets 12 or other suitable means, arranged in openings of the jaws provided for the purpose.

Slidably arranged upon the portion 3 of the shank 1 are nut jaws 13, each of which is provided with an opening therethrough, corresponding to the cross sectional form of the shank portion 3. At one side of the shank 1 the adjacent faces of the nut jaws are provided with V-shaped notches 14, to enable the jaws to grip the nut more firmly. At the opposite side of the shank 1 the nut jaws 13 have openings therethrough threaded in opposite directions. A spindle 15 having a burred head 16, by means of which it can be manually operated, is arranged in the openings of the nut jaws. The spindle 15 has portions threaded to correspond with the respective openings in the nut jaws 13, so that by turning the spindle in one direction or the other the nut jaws are approached or separated.

It will be understood that the nut jaws, which are arranged intermediate of the hub jaws, are movable with respect thereto independent of the means for operating the nut jaws themselves. In other words, the nut jaws may be arranged any distance apart and be collectively movable intermediate of the hub jaws 2 and 9 and longitudinally of the shank 1. Consequently the nut jaws can be easily adjusted in case the nut is not symmetrically disposed with respect to the hub, or if the hub is of unusual form due to accident or design.

The handle 5 may be of any suitable form to afford a secure grip; for example, it may be of angular cross-section or may be burred or roughened.

Having thus described my invention, I claim as new and desire to secure by Letters Patent:

In a wrench of the character described, the combination with a shank having a jaw at one end, a second jaw movably mounted on the shank and adapted with the first jaw to engage a wheel hub, and means for moving the jaws relatively one to the other, of nut jaws mounted on the shank between the hub jaws to slide but not to turn thereon, and means for operating the nut jaws to cause them to approach each other or to be separated, whereby the nut jaws may be arranged any distance apart and collectively movable on the shank intermediate of the hub jaws.

In testimony whereof I have signed my name to this specification in the presence of two subscribing witnesses.

ALBERT LEMUEL SHAW.

Witnesses:
C. T. SHAW,
J. A. WOODWORTH.